April 3, 1945.  C. E. BINNS ET AL  2,372,877
INSULATING SHEET OR STRIP
Filed Nov. 16, 1942
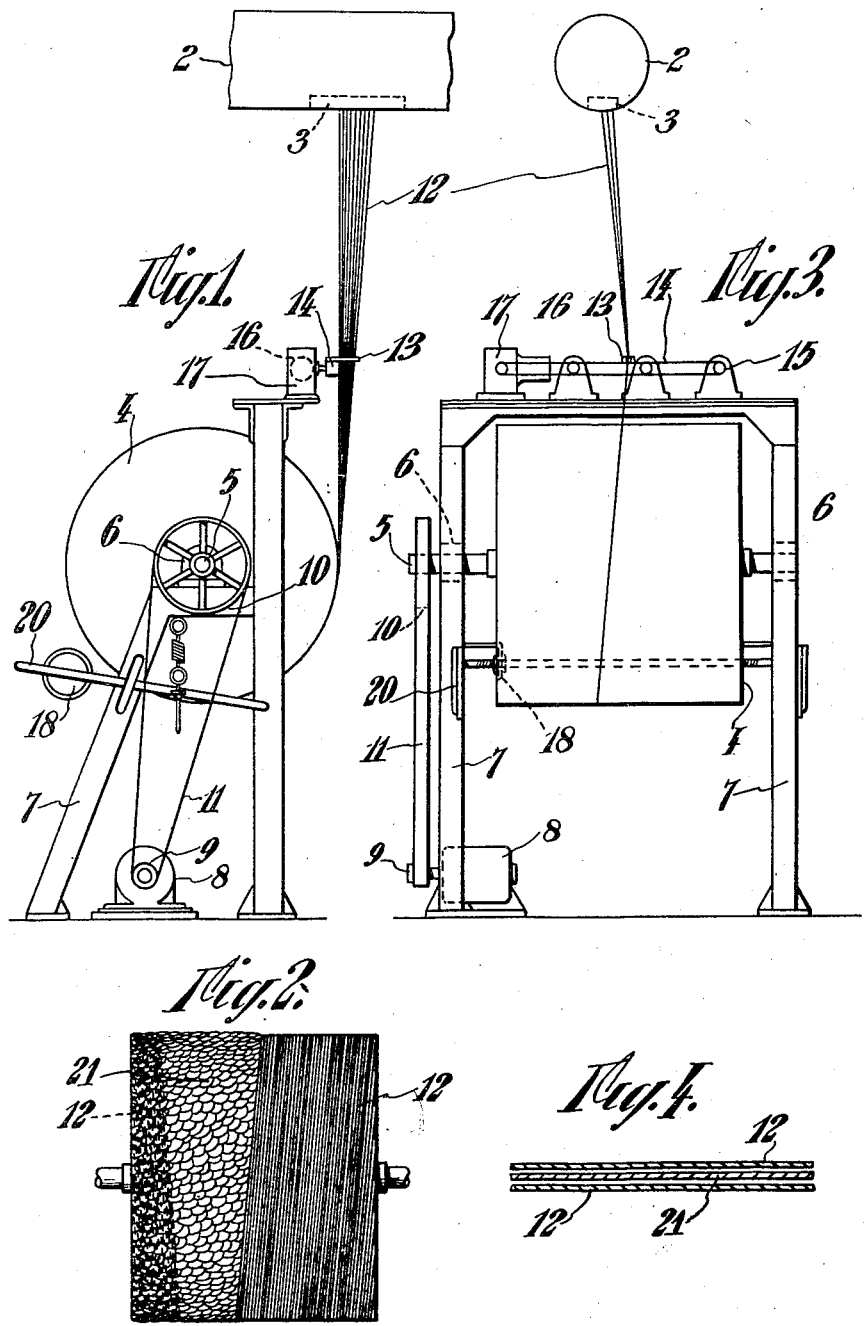

Patented Apr. 3, 1945

2,372,877

UNITED STATES PATENT OFFICE 2,372,877

INSULATING SHEET OR STRIP

Charles Edward Binns and Stanley Palmer, Liversedge, England, assignors to Versil Limited, Liversedge, England, a company of Great Britain and Northern Ireland Application November 16, 1942, Serial No. 465,793
In Great Britain September 23, 1942

4 Claims. (Cl. 154—2.6)

This invention relates to insulating sheets or strips and to the method of making them.

Sheets or strips of glass silk are chiefly used for insulating purposes, but such sheets or strips do not provide perfect insulation. Mica is the perfect insulator but has many drawbacks. It has small tensile strength and a laminated structure and, therefore, mica alone cannot be obtained in large sheets or tape of a length suitable for commercial use. Other good insulators with low tensile strength have the same drawback.

It is known to spread mica by hand onto a flat sheet of silk or paper, using a suitable adhesive, and to cover this if desired with another sheet of silk or paper, but this being done on a flat surface involves the additional step of hydraulically pressing the sheet so formed in order to flatten the mica layer, or layers, and secure adhesion.

According to the present invention the insulating sheet or tape comprises insulating material of low tensile strength to which is bonded by means of an adhesive having suitable di-electric properties a covering of glass fibres. If desired, the sheet or tape may comprise a sandwich of two layers of glass silk with a layer of mica between them. The process of manufacturing a sheet or tape according to the invention consists in applying the covering of glass fibres under tension to a drum on which the insulating material has been applied whereby the necessity of the additional step of pressing the composite sheet is avoided.

One form of apparatus for carrying out the present invention is illustrated in the accompanying drawing, wherein:

Fig. 1 is a side elevation of one form of apparatus for carrying out the method according to the present invention;

Fig. 2 is a front view of the drum shown in Fig. 1 on which a layer of glass silk has been wound and the mica flakes are in the process of being applied in overlapping relation.

Fig. 3 is a front elevation of the apparatus illustrated in Fig. 1 showing a layer of glass silk being wound on top of the mica flakes.

Fig. 4 shows a short length of tape made on the machine illustrated in Figs. 1 and 3, the layers of the tape being separated to show its construction.

Referring to the drawing a glass furnace 2 and associated spinning bar 3 are arranged above a drum 4 adapted to revolve about a horizontal axis and provided with means for driving it at the desired speed or speeds. As shown the drum is carried by a shaft 5 which is supported in bearings 6 mounted on the framework 7 and is driven by a motor 8, pulleys 9, 10 and a belt 11. The glass filaments 12 issuing from the furnace through the spinning bar are guided by a pair of pins 13. The guide is carried by an endless band 14 running on rollers or pulleys 15 across the width of the drum so as to be traversed to and fro by the motor 16 through the gear box 17. An eye or other guiding or grouping device or a single inclined pin may be employed instead of the pins 15 if desired.

For the cutting operation, a wheel type cutter 18 is traversed across the face of the drum at the requisite speed by any of the usual forms of traversing gear.

In the case where it is desired to produce a sheet or strip comprising two layers of glass silk 12 with a layer of mica 21 between them the following procedure is adopted.

The drum 4 on which the sheet is to be formed is first lubricated and a layer or layers of glass silk of the required thickness is spun onto that drum 4. The glass silk sheet so spun is sprayed with a suitable varnish, for example, Paralac No. 2001, a heat hardenable, soluble, synthetic resin of the phenol-formaldehyde type. While the varnish is still tacky, mica splittings 20 are placed on the drum 4 as indicated in Fig. 2, so that all the silk filaments on the drum are covered, the mica splittings 20 being so arranged that each individual splitting overlaps its neighbour in the horizontal direction and each row of horizontal splittings overlaps the previous row of horizontal splittings such that the leading edge of each row is overlapped by the trailing edge of each successive row of mica splittings. A further layer or layers of glass silk is/are then spun onto the drum 4 on top of the mica 20 which owing to the arrangement of the splittings presses down the splittings without disturbing them. The composite sheet thus formed is baked or dried at the required temperature. In the case where Paralac 2001 is used as the varnish, the sheet is heated to 110° C. for half an hour. The sheet is then cut off the drum 4, or where strips are required the strips are cut helically from the drum. Fig. 4 shows the layers of glass silk and mica.

It will be understood that the invention is not limited to a sheet or tape having two layers of glass silk and one layer of mica splittings. There could be one layer of mica with a glass silk covering or any combination of layers of each material.

For example, if it is desired only to have a covering of glass fibres on one side then the process is as follows: The drum is first coated with grease and then sprayed with varnish or on to which the mica flakes are spread and caused to adhere, the flakes being arranged in the particular manner already described and glass fibres are then wound over the layer of mica flakes to form the covering. A tape constructed as above will have less tendency to split in the longitudinal direction.

The process according to the present invention allows excess bonding varnish and/or air bubbles to come to the surface more readily as the winding proceeds and ensures that the splittings do not catch the filaments and become displaced themselves or damage the tensioned filaments. By this process also the necessity of a further step of pressing the mica and filaments together to secure bonding is obviated as the necessary pressure is secured by the tension of the filaments.

Material other than mica could be used with the glass silk, for example Japanese tissue, asbestos paper, sheet rubber or silk.

What we claim and desire to secure by Letters Patents is:

1. Process for the manufacture of an electric insulating sheet which consists in coating a rotatable drum with an adhesion resisting layer, applying a layer of varnish over said adhesion resisting layer, applying mica splittings in overlapping relation with all exposed edges trailing in relation to the direction of rotation of the drum, rotating said drum to wind glass silk fibers under tension over said splittings to form a layer and treating the whole to cause the layer of glass silk fibers to adhere to the mica splittings.

2. Process for the manufacture of an electric insulating sheet which consists in coating a rotatable drum with an adhesion resisting layer, applying a layer of varnish over said adhesion resisting layer, applying mica splittings in rows to said layer of varnish so that each individual splitting overlaps its neighbor in the axial direction of the drum and each row overlaps the preceding row, the exposed edges of the splittings pointing against the direction of rotation of the drum, rotating said drum to wind glass silk fibers under tension over said splittings to form a layer and treating the whole to cause the layer of glass silk fibers to adhere to the mica splittings.

3. Process for the manufactue of an electric insulating sheet which consists in coating a rotatable drum with an adhesion resisting layer, applying a layer of glass silk fibers to the drum, applying a layer of varnish over said layer of glass silk fibers, applying mica splittings to said layer of varnish in overlapping relation with all exposed edges trailing in relation to the direction of rotation of the drum, rotating said drum to wind glass silk fibers under tension over said splittings to form a layer and treating the whole to cause the layers of glass silk fibers to adhere to the mica splittings.

4. Process for the manufacture of an electric insulating sheet which consists in coating a rotatable drum with an adhesion resisting layer, applying a layer of glass silk fibers to the drum, applying a layer of varnish over said layer of glass silk fibers, applying mica splittings in rows to said layer of varnish so that each individual splitting overlaps its neighbor in the axial direction of the drum and each row overlaps the preceding row, the exposed edges of the splittings pointing against the direction of rotation of the drum, rotating said drum to wind glass silk fibers under tension over said splittings to form a layer and treating the whole to cause the layers of glass silk fibers to adhere to the mica splittings.

CHARLES EDWARD BINNS.
STANLEY PALMER.